United States Patent Office 2,962,470
Patented Nov. 29, 1960

2,962,470

LINEAR POLYESTER-POLYURETHANE PRODUCT AND PROCESS OF PREPARING SAME

Shee L. Jung, Wilmington, Del., assignor to E. I. du Pont de Nemours and Company, Wilmington, Del., a corporation of Delaware No Drawing. Filed Jan. 9, 1958, Ser. No. 707,866

12 Claims. (Cl. 260—45.4)

This invention relates to linear segmented polymers comprising urethane segments linked to polyester segments through urethane groups. It further relates to the critical selection of polyesters and urethane-forming reactants to provide polymers which may be shaped into filaments of high elasticity.

There is a particular need in the textile field for elastic filaments to replace rubber. Most rubber fibers that are used in textile applications are tiny strips of film that have been cut from a sheet of rubber. This sheet, before slitting, has to be milled with stabilizers and curing agents and cured at elevated temperatures for several minutes. The fibers or film strips produced by this route have many disadvantages. First, really fine denier fibers cannot be produced because of the limits imposed by the cutting process; furthermore, rubber is so weak and has such poor abrasion resistance that fine denier yarns cannot be practically produced. The process for producing the rubber yarns is expensive and their durability in ultraviolet light is poor. It is therefore desirable to find an elastomer which has improved toughness suitable for making fine denier yarns and consequently lighter weight fabrics. Improved toughness in yarns will also give improved service (less failure by breaking) in fabrics. It is desirable to find an elastomer which can be spun into yarn by relatively cheap melt- or dry-spinning processes. Furthermore, an elastic fiber with greater ultra-violet durability than rubber would be desirable.

Many synthetic rubbers have been developed in recent years. Of these, a polyurethane rubber based on linear polyesters has become well known under the name of "Vulcollan." "Vulcollan" is described in articles by O. Bayer et al., 23 Rubber Chemistry and Technology 812–835 (1950) and E. Muller et al., 26 Rubber Chemistry and Technology 493–509 (1953). These references show that "Vulcollan" is prepared by reacting an isocyanate-modified polyester with a suitable chain-extender, e.g., a glycol, to produce a linear polyester-urethane intermediate which is then cross-linked or "cured" to produce the final "Vulcollan" product. Thus, as with many of the recently developed synthetic rubbers, "Vulcollan" has a cross-linked structure which renders it useless for the spinning of elastic fibers. This structure is described on page 818 of the above-cited Bayer article as follows: "The essentially linear forms are united at relatively few points by the formation of a network, but this structure imparts the highly elastic and valuable properties to the products." The art on "Vulcollan" in particular, and polyurethane elastomers in general, has become quite complex and crowded, but in all of this art there has been no recognition that the uncross-linked intermediate may form useful articles without a curing step.

Brenschede U.S. 2,755,266 discloses the preparation of so-called elastic fibers from the "Vulcollan" products. Like his predecessors, Brenschede considers his polymers cross-linked, and is surprised to find that they form solutions. The "elastic fibers" described in this reference have extremely poor elastic properties and are quite unsuitable for commercial use. The reference fails to teach the critical selection of polyesters and urethane-forming reactants to which the present invention relates.

There has, thus, been no recognition of the critical selection of starting materials necessary to make a suitable elastic fiber. On pages 502–503 in the above-cited Muller article, as well as in U.S. Patent 2,729,618 granted to Muller et al., it is disclosed that "extrusion and calendering are also possible within the scope of glycol cross-linking." It is stated that several percent hard paraffin or wax must be added to prevent sticking. A plastic material is thus obtained which at temperatures between 40–100° C. can be formed in a conventional extruder into threads, strips, or tubes. "To complete the reaction, these articles are subsequently heated as usual." However, in this reference there is no recognition that the uncured polymers have any utility and, the "elastic threads" described in this reference lack suitable elastic properties for commercial use. Thus, it has not been recognized or taught which diisocyanates, which polyesters, and which glycols together yield elastic fibers having the necessary properties for commercial textile use.

An object of this invention, therefore, is to provide soluble linear polymers of the polyester-urethanes which are suitable for shaping into elastic fibers. Another object is to provide elastic fibers composed of segmented polyester-urethanes which have the required elastic properties by virtue of critically selected reagents. A further object is to provide elastic filaments with high sticking temperatures. An additional object is to provide polyester-urethanes having a high order of color stability to ultra-violet light. These and other objects will appear as the description of the invention proceeds.

The objects of this invention are accomplished by a segmented, substantially linear, polyester-urethane polymer, the polyester segment being the residue on removal of terminal OH groups from a hydroxyl-terminated polyester having a melting point below about 60° C. and a molecular weight above 600, the said segment being connected through urethane linkages to a second segment containing the group —O—R—O—, said second segment being at least one repeating unit of a urethane polymer having a melting point above about 250° C. in its fiber-forming molecular weight range, wherein R is the residue on removal of OH groups from an aromatic diol.

The polymers which make up the elastic fibers of this invention may be diagrammatically represented. One repeating unit of such a polymer is:

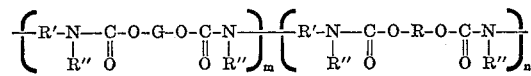

wherein G represents the residue on removal of the terminal OH groups from a hydroxyl-terminated polyester having a melting point below about 60° C. and a molecular weight above about 600; R is a divalent aromatic radical; R' is a divalent organic radical containing more than one carbon atom; R" is a member of the class consisting of hydrogen and a hydrocarbon radical which, in combination with all or part of R', may form a ring; and $m$ and $n$ are positive integers greater than zero. R, R' and R" are chosen such that the polyurethane

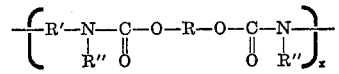

melts above 250° C. in the fiber-forming molecular weight range, i.e., above about 10,000. $x$ is a positive integer sufficiently large to give a molecular weight in this range.

One method for preparing such polymers is to react a selected polyester with an excess of phosgene to provide a polyester with terminal chloroformate groups. This polymer, together with the bischloroformate of an aromatic diol, is then brought into reaction with an organic diamine to provide the linear segmented polymers of this invention. The elastic filaments from such polymers have outstandingly high fiber stick temperatures. Such temperatures are usually above 150° C.

One embodiment of this invention is shown in the following diagrammatic structure:

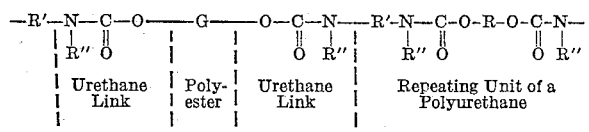

In this structure, one repeating unit of a segmented polymer falling within the scope of this invention is set forth. The polymer represented therein is formed by reacting one mole of the bischloroformate of a hydroxyl-terminated polyester HO—G—OH, and one mole of the bischloroformate of an aromatic diol HO—R—OH, with two moles of an organic diamine R″HN—R′—NHR″. In this embodiment, subscripts $m$ and $n$ in the representation above are both equal to unity.

For utility in fiber and filament applications, it is desirable to have elastic products which require no after-curing or after-treatment. In order to be suitable in textile applications for the replacement of rubber yarns, a synthetic elastic fiber should have the following properties as a minimum requirement:

Tensile recovery of 90% or more,
Stress decay of less than 20%, and
Fiber stick temperature of over 150° C.

"Tensile recovery" is the percentage return to the original length within one minute after the tension has been released from a fiber sample which has been elongated 50% at the rate of 100% per minute, and held at 50% elongation for one minute. "Stress decay" is the percent loss in stress in a yarn one minute after it has been elongated to 50% at the rate of 100% per minute. "Polymer melt temperature" is the minimum temperature at which a sample of the polymer leaves a wet, molten trail as it is stroked with moderate pressure across a smooth surface of a heated brass block. The "polymer melt temperature" has sometimes in the past been referred to as the "polymer stick temperature." The "fiber stick temperature" is the temperature at which the fibers will just stick to a heated brass block when held against the surface of the block for 5 seconds with a 200 g. weight.

Elastic fibers having the above-described minimum requirements are provided by the segmented polyester-urethane polymers described above. These polymers are composed of "soft segments" and "hard segments" alternating in the polymer chain. The "soft segment" is a polyester having a molecular weight between about 600 and 5000 and melting below about 60° C. As indicated above, such a polymer may be provided with chloroformate end groups, and together with the bischloroformate of an aromatic diol may be reacted with a suitable diamine. The polyurethane portion, comprising the diamine and diol moieties, in the resulting polymer chain then constitutes the "hard segment." For elastic fiber applications, the suitable diamines and the bischloroformates of suitable aromatic diols are those which form in an independent reaction a polyurethane with a melting point above 250° C. when its molecular weight is high enough to be in the fiber-forming range (above about 10,000). The preferred elastomeric products for fiber applications have melting points above about 150° C., and the "soft segments" of the preferred elastomers have molecular weights between about 1000 and 3000. To produce polymers which are elastomers at room temperature, it is required that the "soft segments" comprise about 60 to 90% by weight of the polymeric product.

The polyester from which the "soft segment" in the elastomer is derived may contain a single type of linkage such as in the conventional polyesters, or it may have more than one type of linkage, as in the polyesters chain-extended with diisocyanates. In the latter case, ester and occasionally urethane linkages occur in the polymer chain. Even where the linkages are the same, the compositions may be a copolymer such as a copolyester. Copolymer formation is a useful method for modifying the properties of the polyester "soft segment," such as for reducing the melting point to a useful level. The polyester may be substituted with halogen, alkyl, and similar groups which do not interfere with the subsequent polymerization under the conditions used. In the practice of the invention, the proper reactants are chosen to produce a low molecular weight polymer with hydroxyl end-groups and with the required low melting point. Compounds with the desired combination of molecular weight and low melting point are usually obtained by interrupting the structure frequently with side chains or by introducing atoms other than carbon atoms into the main polymer chain.

The low molecular weight polyesters used in the practice of this invention can be prepared by reacting acids, esters, or acid halides with a molar excess of glycols. Primary or secondary glycols may be used. Suitable glycols are the polymethylene glycols, e.g., ethylene, propylene, butylene, decamethylene, substituted polymethylene glycols, such as 2,2-dimethyl-1,3-propanediol, cycloaliphatic glycols such as cyclohexanediol, and secondary glycols such as 2,5-hexanediol. These glycols may be reacted with the proper molar ratio of aliphatic, cycloaliphatic or aromatic acids or their ester-forming derivatives to produce low molecular weight polymers terminated essentially with hydroxyl groups, although the presence of a few carboxyl end-groups is not detrimental. Suitable acids for preparing polyesters and/or copolyesters are succinic, glutaric, adipic, suberic, sebacic, isophthalic, and hexahydroisophthalic acids. The alkyl- and halogen-substituted derivatives of these acids may also be used. In any case, a polyester is chosen such that it melts below 60° C. A polyester melting below 50° C. is preferred.

Any aromatic diol is suitable for the preparation of elastomers according to this invention. For organic diamines generally, non-aromatic diols are unsuitable for the practice of this invention, usually because they yield segmented polyester-urethanes having too low a melting point for commercial fiber use. Preferably, the suitable aromatic diols are those which are components of high-melting polyurethanes as described in Wittbecker U.S. Patent 2,731,445. As described therein, such diols are dihydroxy aromatic hydrocarbons of 6 to 16 carbon atoms in which the shortest chain of carbon atoms connecting the two hydroxy radicals includes at least three carbon atoms of one ring. These include the following diols: hydroquinone, resorcinol, p,p′-diphenylolmethane, p,p′-diphenylolpropane, p,p′-dihydroxybiphenyl, 3,3′-dihydroxybiphenyl, 2,6-dihydroxytoluenes, 4,4′-dihydroxybenzyl, 4,4′-dihydroxy-2,2′-dimethylbiphenyl, 1,5-dihydroxynaphthalene, 2,6-dihydroxynaphthalene and 1,4-dihydroxynaphthalene. Certain additional compounds, not classifiable as dihydroxy aromatic hydrocarbons but included within the broader class of dihydric phenols of 6 to 16 carbon atoms devoid of reactive radicals other than the two phenolic OH radicals and in which the shortest chain of atoms connecting the two OH radicals includes at least 3 carbon atoms of one ring, are also entirely suitable for the purposes of this invention. These include 4,4'-dihydroxydiphenyl ether, 3,3'-dihydroxyldiphenyl sulfone, and 4,4'-dihydroxydiphenyl sulfone.

The symmetrical aromatic diols constitute a preferred group of reagents in that they lead to higher melting polyurethanes than do unsymmetrical diols. These include the following p-oriented aromatic diols: hydroquinone, p,p'-diphenylolpropane, and p,p'-dihydroxybiphenyl. A "hard segment" containing a unit of a high-melting polyurethane provides an excellent "tie point" for joining the low-melting, amorphous "soft segments," so that a polymer is produced having good elastic properties, i.e., a high tensile recovery and a low stress decay. Symmetrically substituted p-oriented aromatic diols are likewise in the preferred group. For example, tetrachlorohydroquinone may be used to achieve an even higher melting point. Considering structure and availability, hydroquinone is the preferred diol.

The bischloroformates of the aromatic diols and of the hydroxyl-terminated polyesters may, alternatively, be bromo-, iodo-, or fluoroformates, but usually the chloroformates are employed, since they are easily prepared from the dihydroxy compound by the use of phosgene.

In those cases wherein the essentially hydroxyl-terminated polyester has an appreciable number of carboxyl end groups, the bischloroformate of such a polyester tends to yield low molecular weight polymeric products. Such a phosgenated polyester may be treated with a small amount of thionyl chloride at room temperature to improve the bifunctionality. The carboxyl ends are presumably thereby converted to reactive acid chloride end groups.

As indicated above, the elastic properties attained by this invention result in part from the novel combination of a segment of a "hard" or high-melting polymer with a "soft" or low-melting polymeric segment. The polyurethanes from which the former segments are derived all melt above 250° C. as for example, the polyurethane from piperazine and hydroquinone is not melted at temperatures as high as 375° C. The diamines used as components for the "hard segments" may be aliphatic alicyclic, aromatic, or heterocyclic. To form elastic fibers, it is required that the diamine and aromatic diol be components of a polyurethane melting above 250° C. Each amino group must be either primary or secondary. Suitable diamines include ethylenediamine, hexamethylenediamine, N,N'-dialkylhexamethylenediamine, p-xylylenediamine cyclohexylenediamine, p-phenylenediamine, p,p'-methylenedianiline, piperazine, and 2,5-dimethylpiperazine. Mixtures of diamines may be used as well. Diacid halides may be included in the compositions in minor amounts to form amide linkages. Derivatives of the diamines listed may also be used as long as the substituents do not interfere with the polymerization. For example, the aromatic diamines may have hydrocarbon side chains or be substituted with halogens or nitro groups which are inert under the conditions used herein. Because of the effect on melting points as explained above, the symmetrical cyclic diamines constitute a preferred group.

Because they yield polymers having an even higher degree of color stability to ultraviolet light as well as an improved solubility in solvents from which fibers may be spun, the disecondary diamines also constitute a preferred class. Both of the above characteristics are found in piperazine and certain substituted piperazines, and the use of these symmetrical, secondary, cyclic diamines is preferred.

Although the "hard segments" have been described as repeating units of urethane polymers, such a polymer may be a homopolymer or copolymer. The "hard segment" may also contain amide or sulfonamide linkages. The preferred length of the "hard segment" depends upon the melting point of the segment and to some extent on the molecular weight of the polyester "soft segment." The length of the "hard segment" may be controlled by using a molar excess of bischloroformate of the aromatic diol compared to bischloroformate of the hydroxyl-terminated polyester. When no molar excess is used, the length of the "hard segment" will be at a minimum. As the "hard segment" becomes shorter, it is preferred that it be a unit of a higher melting polymer. For those segmented polymers in which the urethane segment is reduced to the minimum length (i.e., the polyester segments are separated by only a single unit of the polyurethane), it is preferred that this be a unit of a polymer which melts above 300° C.

As indicated above, the polyesters making up the "soft segments" of the elastomer may be homopolymers or copolymers. The essential features are that they be difunctional and have a melting point below 60° C. For example, poly(ethylene adipate) having a molecular weight of about 2100 has a melting point of 44–48° C. The melting points of the polyesters are generally not sharp and may vary for a given molecular weight. Copolymers usually melt lower and show less tendency toward undesirable crystallization in the final segmented polymer. However, polymers used in accordance with this invention are similar in filament-forming and elastic properties, while polymers prepared outside the molecular weight limitations of this invention will differ in such properties.

Elastic fibers prepared from the polyester-urethanes of this invention display good color stability, good light durability, good thermal stability and good hydrolytic stability. By color stability is meant the resistance to discoloration from ultraviolet light. By light durability is meant retention of mechanical properties (stress decay, tensile recovery, tenacity, etc.) on exposure to ultraviolet light. Thermal stability refers to the retention of mechanical properties on exposure to high temperatures. Hydrolytic stability refers to retention of properties on exposure to aqueous alkaline solutions. It is surprising that the elastic filaments of this invention are superior in color stability and light durability to filaments from the linear segmented polyester-ureas. Accordingly, when resistance to degradation by sunlight or ultraviolet radiation is important, the use of urethanes in the "hard segments" of the elastomers of this invention has a great advantage over the use of ureas for the same purpose. Furthermore, the use of polyesters in the "soft segments" of these elastomers has the advantage over the use of polyethers for the same purpose in that the polyester-urethanes have improved color stability and light durability compared to the polyether-urethanes. In this respect, the use of N-alkylated polyurethanes in "hard segments" yields elastomers having an even higher degree of color stability. Furthermore, elastomers having N-alkylated polyurethane "hard segments" are generally more soluble in acidic solvents than the corresponding elastomers having analogous unalkylated polyurethane "hard segments." This feature is important in the spinning of elastic fibers, and, consequently, the elastomers having N-alkylated polyurethane "hard segments" constitute a preferred class in this invention.

The polymers of this invention may be prepared by: (1) interfacial polymerization, or (2) solution polymerization.

Interfacial polymerization has rapidly been attaining increased importance in the polymer field. It is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. The reactants in one liquid phase may be one or more of the diamines, and the reactants in the other liquid phase may be one or more of the bischloroformates. The two liquid phases are mixed to form a two-phase system in which the diamine and the bischloroformate are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it, at least partially. To facilitate formation of high molecular weight polymers, acid acceptors are generally used in the system when an acid is liberated by the reaction, such as in the reaction of diamines with bischloroformates. The phases are mixed until the desired condensation polymerization has taken place, and then if desired, the polymer obtained is isolated.

Solution polymerization is generally preferred in preparing the polymers by the diisocyanate route described below. This involves dissolving the reactants in separate portions of the same solvent, which is inert to the reactants, e.g., benzene, chloroform, methylene chloride, and then mixing these solutions to form the polymers of this invention. The molecular weight of the polymers is controlled by the choice of the solvent medium and/or by the relative quantities of reagents used.

When the polymerization reaction has been carried out in a solvent in which the reaction product remains soluble, films or coatings may be formed by pouring or otherwise applying a solution to form a thin film and allowing the solvent to evaporate.

For optimum results the copolyurethanes of this invention should have an inherent viscosity of the order of 1.0–3.0 or above, although copolymers having inherent viscosities as low as 0.5 are useful. Polymers in the lower molecular weight range are useful in certain applications, such as the preparation of molded objects. However, the ones of particular interest are those with molecular weights in the fiber-forming range, i.e., above about 10,000. Inherent viscosity is defined as:

$$\frac{\ln \eta_r}{C}$$

in which $\eta_r$ is the viscosity of a dilute solution of the polymer divided by the viscosity of the solvent in the same units and at the same temperature, and C is the concentration in grams of the polymer per hundred ml. of solution. The inherent viscosities recorded here were measured in m-cresol at 25° C. In most cases a concentration of 0.5 gram per hundred ml. of solution was used.

The polymers of this invention may be obtained by routes other than by the reaction of bischloroformates with diamines. For example, a hydroxyl-terminated polyester may be reacted with a molar excess of an organic diisocyanate to provide a polymer with terminal isocyanate groups. The isocyanate-terminated polymer is then reacted with an aromatic diol to provide the linear segment polymers of this invention. Suitable diisocyanates include p-phenylene diisocyanate, 4,4'-biphenylene diisocyanate, p,p'-methylenediphenyl diisocyanate, and p,p'-isopropylidenediphenyl diisocyanate. The diisocyanate may contain other substituents, although those which are free from reactive groups other than two isocyanate groups are ordinarily preferred. As in the case of the diamines described hereinbefore, symmetrical cyclic diisocyanates are preferred. The formation of isocyanate-terminated polyester will be accompanied by no appreciable chain-lengthening if two moles or more of diisocyanate are reacted per mole of polyester. If less than a 2:1 molar ratio is used, a polymer will be formed with corresponding increase in molecular weight. Such products are useful in the practice of this invention provided that the molecular weight of the chain-lengthened polymer is less than 5000. It should be noted that the N-alkylated polyurethane 'hard segments,' i.e., those polyurethanes in which there are no hydrogen atoms attached to nitrogen atoms, are not obtainable by the isocyanate route. Therefore, the bischloroformatediamine route is preferred in the practice of this invention.

In the following illustrative examples, parts given are by weight, except where otherwise noted. "Tenacity" is a measure of the tensile strength of fibers expressed in grams per denier (g.p.d.). "Elongation" is the percent elongation of the fiber at the breaking point. "Initial modulus" is determined by measuring the initial slope of the stress-strain curve. "$M_{50}$" is the slope of the stress-strain curve at 50% elongation.

Example I

A mixture of 1.68 moles of 2,5-hexanediol and 1.4 moles of adipic acid is heated under nitrogen for 22 hours at 190° C. at atmospheric pressure, and then for 24 hours at the same temperature at 3 mm. pressure. There is obtained a poly(1,4-dimethyltetramethylene adipate) as a viscous liquid having by analysis 930 OH groups and 201 carboxyl groups per million grams of polymer indicating a molecular weight of 1790. The polyester is treated with an excess of phosgene and then with a small amount of thionyl chloride at room temperature to convert the OH groups to chloroformate groups and the carboxyl groups to acid chloride end groups.

A solution is made by dissolving 2.62 grams of piperazine (0.0305 mole) and 7.57 grams of sodium carbonate (0.06 mole) in 200 ml. of water in a blendor. To this rapidly stirred solution is added at room temperature over a period of about two minutes a solution containing 14.77 grams of the macrobischloroformate described above (0.0078 mole) and 4.70 grams of the bischloroformate of resorcinol (0.02 mole) in 200 ml. of methylene chloride. After 15 minutes' stirring, the viscous slurry is poured into hot water and filtered, and the polymeric product is then washed several times with hot water. There is obtained in 97% yield a white elastomeric product having an inherent viscosity in m-cresol of 0.93 and a polymer melt temperature of 227° C. This polyester-urethane contains approximately 75% by weight of polyester segments.

A 15% solution of the polyester-urethane described above in chloroform/methanol (88/12) is dry spun in the usual manner yielding 13-denier elastic fibers having the following properties: tenacity 0.20 g.p.d., elongation 625%, initial modulus 0.04 g.p.d., stress decay 11%, tensile recovery 95%, and fiber stick temperature 156° C.

After 115 hours of exposure to ultraviolet light in a Fade-Ometer, the fibers still retain one-half of their original tenacity. After 192 hours total exposure in the Fade-Ometer, no detectable color develops in the fibers.

Example II

The bischloroformate of a hydroxyl-terminated polyester having a molecular weight of 1370 is prepared, as described in Example I, from 2,5-hexanediol and adipic acid. A solution of 10.8 grams of this bischloroformate (0.0073 mole) and 2.35 grams of the bischloroformate of hydroquinone (0.01 mole) in 200 ml. of methylene chloride is added with vigorous stirring to a solution of 2.17 grams of 2,5-dimethylpiperazine (0.019 mole) and 4.72 grams of sodium carbonate (0.038 mole) in 200 ml. of water in a blendor. There is obtained a 92% yield of a polyesterurethane containing approximately 80% of polyester segments.

The polymer is dry spun from an 18% solution in trichloroethane/formic acid (60/40) yielding 6-denier fibers with the following properties: tenacity 0.48 g.p.d., elongation 293%, initial modulus 0.15, $M_{50}$ 0.09, stress decay 15%, tensile recovery 96%, fiber stick temperature 205° C.

Example III

The bischloroformate of a hydroxyl-terminated polyester having a molecular weight of 1520 is prepared, as described in Example I, from 1,4-butanediol and 3,3-dimethylglutaric acid. To a rapidly stirred solution consisting of 2.07 grams of 2,5-dimethylpiperazine (0.0183 mole) in 200 ml. of water in a blendor at room temperature is added a mixture of 2.35 grams of the bischloroformate of hydroquinone (0.01 mole) and 10.8 grams of the above polyester bischloroformate (0.0066 mole) dissolved in 200 ml. of methylene chloride. The thick slurry is poured into hot water and filtered. The precipitated elastomer is rapidly washed with hot water until free of base. There is obtained a 99% yield of polyester-urethane having a polymer melt temperature of 360° C. and an inherent viscosity in m-cresol of 1.6, and containing approximately 80% by weight of polyester segments.

A 21% solution of the segmented elastomer described above is dry spun in the usual manner from trichloroethane/formic acid to yield 18-denier elastic fibers having the following properties: tenacity 0.44 g.p.d., elongation 526%, initial modulus 0.07 g.p.d., $M_{50}$ 0.07 g.p.d., stress decay 13%, tensile recovery 94%, fiber stick temperature 248° C.

*Example IV*

0.0062 mole of the bischloroformate of the polyester described in Example I and 0.0147 mole of the bischloroformate of resorcinol is reacted with 0.023 mole of 2,5-dimethylpiperazine according to the procedure given in Example I. There is obtained an 83% yield of segmented polyester-urethane containing approximately 75% by weight of polyester segments. Elastic films are obtained by casting a methylene chloride solution of this polyester-urethane.

*Example V*

A polyester-urethane is prepared by the interfacial polymerization technique described in the preceding examples from a solution of 0.0092 mole of the bischloroformate of the polyester of Example II and 0.01 mole of the bischloroformate of hydroquinone in 200 ml. of methylene chloride and a mixture of 0.04 mole of sodium carbonate and 0.02 mole of 4,4'-methylene-bis(cyclohexylamine) (having a high preponderance of the trans isomer) in 200 ml. of water and 100 ml. of methylene chloride. There is obtained a 90% yield of a light brown, segmented polyester-urethane elastomer having a polymer melt temperature of 226° C. and an inherent viscosity of 0.8 in m-cresol, and containing approximately 75% of polyester segments. Elastic films are obtained by evaporating a trifluoroacetic acid solution of this polymer.

*Example VI*

A hydroxyl-terminated copolyester is prepared from 21.6 moles of ethylene glycol, 14.4 moles of propylene glycol and 30 moles of adipic acid, to yield a polyester having by analysis 700 OH groups and 12 carboxyl groups per million grams of polymer, indicating a molecular weight of 2820. A mixture of 28 grams of this copolyester and 5 grams of p,p'-methylenediphenyl diisocyanate is heated under nitrogen for one hour at 85° C. To the isocyanate-terminated polyester is added an additional 10 grams of p,p'-methylenediphenyl diisocyanate, 11.3 grams of diphenylol-propane, and 115 ml. of dimethylformamide. The mixture is stirred and heated for 3 hours at 125° C. to yield a solution of a segmented polyester-urethane, having poly(ethylene/propylene adipate) "soft segments" and urethane "hard segments" derived from diphenylolpropane and methylenedianiline. The viscous solution is dry spun in the usual manner to yield elastic filaments.

This invention represents an important development in that it demonstrates for the first time a method for preparing polymers which have both a high polymer melt temperature and a low second order or glass transition temperature. In the prior art, a number of rubbery polymers with relatively low second order transition temperatures have been prepared. These polymers have invariably had low polymer melt temperatures and tended to creep on extension. Therefore, it has usually been necessary to cross-link them in order to obtain good elastic properties. These limitations have restricted their usefulness. For example, the insolubility and infusibility of the cross-linked products makes subsequent processing difficult. Polymers with high polymer melt temperatures also have had in the past high second order transition temperatures; this means that they tend to be non-elastic at room temperature. The transition temperature can be lowered and the room temperature elasticity correspondingly increased through copolymer formation. However, this has invariably led to a large drop in the polymer melt temperature.

The elastic polymers of this invention are unique in that they are linear polymers with properties equivalent to those of the cured, cross-linked elastic products now available. This has been accomplished by substituting crystalline, high-melting components for the chemical cross-links of cured elastomers, such as rubber. The absence of cross-links results in improved solubility. The practical end result is that these polymers can be dissolved in fairly common solvents which can be used to prepare solutions which are readily adapted to the preparation of filaments.

An outstanding feature of this invention is that it is possible to prepare fairly concentrated solutions of many of the polyester-urethanes, and such solutions can be used directly in the preparation of filaments, bristles, and similar articles. Filaments can be prepared by dry or wet spinning. In shaping filaments using solutions, solvents which have been found satisfactory for preparing solutions of suitable concentration are N,N-dimethylformamide, N,N-dimethylacetamide, mixtures of chloroform and methanol, mixtures of trichloroethane and formic acid, and mixtures of acetone and dimethylformamide.

Conventional conditions are used for dry spinning except that the elastic filaments usually have to be talced or lubricated, usually with water, because they tend to be somewhat tacky immediately after extrusion. Spinning speeds are usually lower than those used in some commercial dry spinning processes for textile filaments, although speeds in excess of 300 yards per minute have been attained with elastic filaments, which represents excellent productivity for filaments of this type. It is usually found that superior elastic filaments are produced according to this invention by dry spinning rather than by wet spinning.

When wet spinning, the spinning speeds are usually lower, but this procedure has definite advantage when large denier filaments are being prepared. The preferred solvents for wet spinning are N,N-dimethylformamide and N,N-dimethylacetamide, and these solutions are usually extruded into a hot water bath.

It is possible to prepare stable dispersions of the elastomers of this invention, and shaped articles can be prepared by extruding, coagulating the dispersions, and coalescing the polymer particles. In some instances, heat coalescing is satisfactory, whereas for others a solvent will have to be used to promote coalescence. Shaping and polymerization can also be combined into a single step.

A drawing operation is usually not necessary to develop desirable properties, particularly satisfactory elastic properties, in the filaments of this invention. However, the over-all properties of the filaments are frequently improved by a drawing operation, which results in increased orientation and crystallinity in the final structure. Therefore, prior to final packaging, the yarns may be drawn at a suitable draw ratio such as 2 to 10X for the particular elastomer, and relaxed, to give a product with a desired combination of tenacity, initial modulus, yarn elongation, elasticity, and similar properties.

The filaments of this invention have properties which make them useful in such applications as fabrics, rope, paper, and felt, among others. The elastic filaments of this invention are useful as binders for papers and laminates. The higher tenacities, high initial modulus, superior abrasion resistance, and more easily controlled elongation of the filaments of this invention fit them for many applications for which rubber filaments are undesirable. Most of these filaments possess the additional advantage that they are easily fabricated.

The elastic fibers of this invention possess a number of advantageous properties including excellent resistance to heat and cold, outstanding resistance to mechanical abrasion, and to deterioration caused by stretching, flexing and the like. This combination of properties suggests the use of these polymers as uncovered filaments in elastic fabrics and garments. Obviously, these filaments and fibers can also be useful in fabrics and garments when they are covered, as rubber is for such applications. The elastic yarns of this invention are characterized by higher strength and stretch modulus than any rubber threads known. Stretch modulus measures the force required to elongate the yarn a given percentage. A garment made of yarns having high tenacity and high stretch modulus will not only be durable but will also exert substantial pressure on the body of the wearer after the garment is stretched into position as desired, for example, in surgical stockings.

Yarns of this invention have many advantages over rubber threads. For example, they may be spun readily into multifilament yarns and into low denier filaments. They have superior abrasion resistance, very low inherent color, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

The elastic properties of these materials may be varied by suitable compounds. The amount and type of compounding agent to be incorporated is dependent on the use for which the elastomer is intended. The compounding agents ordinarily used in the rubber industry are useful for this invention. These include carbon black, clay, silica, pigments, and plasticizers. Inorganic and organic coloring agents may be incorporated to give a well-defined color. Conventional agents for stabilizing elastomeric compositions to heat or ultraviolet radiation may also be incorporated, but such stabilizers are rarely needed.

Fibers may be prepared from the herein-described polymers having deniers as low as 1. Usually fibers having deniers between 1 and 20 are prepared by dry spinning. Heavier fibers may be prepared by wet spinning having deniers above 20.

In the specification and claims the term urethane includes thiourethanes, and diisocyanates include the diisothiocyanates.

It will be apparent that many widely different embodiments of this invention may be made without departing from the spirit and scope thereof, and therefore it is not intended to be limited except as indicated in the appended claims.

I claim:

1. A synthetic substantially linear segmented polyester-urethane copolymer consisting essentially of intralinear structural units having the formula

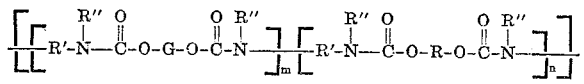

wherein G is the polymeric residue remaining after removal of the terminal hydroxyl groups of a hydroxyl-terminated polyester having intralinear ester linkages in the polymer chain, a melting point below about 60° C., and a molecular weight above about 600, m and n are integers greater than O, R is the residue remaining after removal of the hydroxyl groups from a dihydric phenol having 6 to 16 carbon atoms wherein the shortest chain of carbon atoms connecting the hydroxyl groups includes at least 3 carbon atoms of one aromatic ring, R' is a divalent organic radical containing more than one carbon atom, and R" is selected from the class consisting of hydrogen and hydrocarbon radicals, which in combination with at least a part of R' may form a ring, R, R' and R" being so selected that the structure

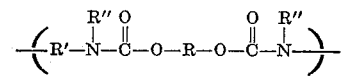

represents a repeating unit of a fiber-forming polyurethane having a melting point above about 250° C. in its fiber-forming molecular weight range, from about 60% to about 90% of said copolymer being provided by said polymeric residues G.

2. The polyester-urethane copolymer of claim 1 in which R' and R" form a ring with adjacent intralinear nitrogens.

having the formula

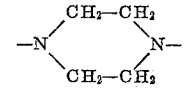

3. The polyester-urethane copolymer of claim 1 in which R' and R" form a ring with adjacent intralinear nitrogens

having the formula

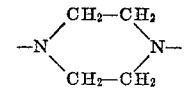

and said dihydric phenol is hydroquinone.

4. The polyester-urethane copolymer of claim 1 in which R" is an alkyl radical.

5. The polyester-urethane copolymer of claim 1 in which said dihydric phenol is a symmetrical dihydric phenol.

6. The polyester-urethane copolymer of claim 1 in which the molecular weight of said hydroxyl-terminated polyester is between 600 and 5000.

7. The polyester-urethane copolymer of claim 1 in which the inherent viscosity of said copolymer is between 1.0 and 3.0.

8. The polyester-urethane copolymer of claim 1 in the form of an unsupported film.

9. The polyester-urethane copolymer of claim 1 in the form of a fiber.

10. A fiber of claim 9 having a denier of less than 50.

11. The process of preparing substantially linear segmented polyester-urethane copolymers which comprises reacting a mixture of a bishaloformate of a hydroxyl-terminated polyester having a melting point below about 60° C. and a molecular weight above 600 and a bishaloformate of a dihydric phenol having 6 to 16 carbon atoms wherein the shortest chain of carbon atoms connecting the two hydroxyl radicals of said dihydric phenol includes at least 3 carbon atoms of one ring, with an essentially stoichiometric amount of an organic diamine, said organic diamine and said bishaloformate of the dihydric phenol being capable of forming a linear urethane polymer having a melting point above 250° C. in its fiber-forming molecular weight range, said bishaloformate of said polyester being present in a ratio with said bishaloformate of said dihydric phenol such that from about 60% to about 90% by weight of said segmented copolymer is provided by said polyester.

12. The process of claim 11 wherein said organic diamine is a disecondary diamine.

References Cited in the file of this patent

UNITED STATES PATENTS

| | | |
|---|---|---|
| 2,729,618 | Muller et al. | Jan. 3, 1956 |
| 2,813,776 | Koller | Nov. 19, 1957 |
| 2,818,404 | Hill | Dec. 31, 1957 |

FOREIGN PATENTS

| | | |
|---|---|---|
| 755,779 | Great Britain | Aug. 29, 1956 |
| 904,471 | Germany | Feb. 15, 1954 |

OTHER REFERENCES

Bayer: Angewandte Chemie, pages 257 to 272, September 1947.